United States Patent [19]

Braden-Harder et al.

[11] Patent Number: 5,630,121
[45] Date of Patent: May 13, 1997

[54] ARCHIVING AND RETRIEVING MULTIMEDIA OBJECTS USING STRUCTURED INDEXES

[75] Inventors: Lisa C. Braden-Harder, Somers; Michelle Y. L. Kim, Scarsdale; Judith L. Klavans, Hastings-on-Hudson; Wlodek W. Zadrozny, Mohegan Lake, all of N.Y.

[73] Assignee: International Business Machines Corporation, Armonk, N.Y.

[21] Appl. No.: 13,888

[22] Filed: Feb. 2, 1993

[51] Int. Cl.$^6$ .................................................. G06F 17/30
[52] U.S. Cl. .......................... 395/604; 395/615; 395/613
[58] Field of Search ........................ 364/DIG. 1, DIG. 2; 395/600, 12, 154, 934, 51, 60, 62, 75, 155, 601, 604, 615, 613

[56] References Cited

U.S. PATENT DOCUMENTS

| | | | |
|---|---|---|---|
| 5,010,500 | 4/1991 | Makkuni et al. | 364/521 |
| 5,113,496 | 5/1992 | McCalley et al. | 395/200 |
| 5,121,470 | 6/1992 | Trautman | 395/140 |
| 5,123,088 | 6/1992 | Kasahara et al. | 395/159 |
| 5,197,005 | 3/1993 | Shwartz et al. | 364/419 |
| 5,265,065 | 11/1993 | Turtle | 395/600 |
| 5,278,946 | 1/1994 | Shimada et al. | 395/62 |
| 5,278,980 | 1/1994 | Pedersen et al. | 395/600 |
| 5,297,249 | 3/1994 | Bernstein et al. | 395/156 |
| 5,301,314 | 4/1994 | Gifford et al. | 395/600 |
| 5,309,359 | 5/1994 | Katz et al. | 364/419.19 |
| 5,331,554 | 7/1994 | Graham | 364/419.07 |
| 5,379,366 | 1/1995 | Noyes | 395/54 |
| 5,386,556 | 1/1995 | Hedin et al. | 395/600 |
| 5,418,948 | 5/1995 | Turtle | 395/600 |

FOREIGN PATENT DOCUMENTS 0175928 8/1985 European Pat. Off.

OTHER PUBLICATIONS

V.Y. Lum et al, "An Architecture for a Multimedia Database Management System Supporting Content Search", Advances in Computing and Information, 23 May 1990, pp. 305–313.

A. Yamamoto et al, "Extraction of Object Features from Image and Its Application to Image Retrieval", Proc. 9th. Int. Conf. on Pattern Recognition, 14 Nov. 1988, pp. 988–991.

Patent Abstracts of Japan, vol. 16, No. 199 (p–1351) 13 May 1992, JP–A–04 030 265 (Hitachi Ltd.) 3 Feb. 1992 (Abstract).

C. Baudin et al, "Question–based Acquisition of Conceptual Indices for Multimedia Design Documentation", Proc. 11th Nat. Conf. on Artificial Intelligence, 11 Jul. 1993, pp. 452–458.

(List continued on next page.)

Primary Examiner—Thomas G. Black
Assistant Examiner—Maria N. Von Buhr
Attorney, Agent, or Firm—Louis J. Percello

[57] ABSTRACT

To archive information, a phrase or sentence describing the information, typically expressed in a natural language and conforming to the rules of a grammar (like a natural language grammar) is used to create a structured index which also conforms to the natural language grammar. The structured index has structure because the words in the index have a function and a relationship among each other as determined by the grammar. The index is combined with a location pointer of information to be cataloged, preferably multimedia information, to form a matched pair, i.e., a structured index and a segment (or a pointed to a multimedia object). The matched pair is stored in a database for later retrieval. Retrieval is based on parsing a query into a query structure that is identical or similar to the structured index. A heuristic interface presents the multimedia information along with a template in order to prompt the user into describing the multimedia information with a string of words so that they conform to the grammar.

9 Claims, 5 Drawing Sheets

OTHER PUBLICATIONS

M. McCord et al. "Natural Language Processing Within a Slot Grammar Framework", Jun. 1992.

IBM TDB Mar. 1992. vol. 34 No. 10A (DA8910420) "Distribution Intercept Object Manager" pp. 58–60.

IBM TDB May 1988 vol. 30 No. 12, (RA8870077) "Command Interface For Controlling Videodisc Players" pp. 433–435.

IBM TDB Jun. 1992 vol. 35 No. 1A (DA8900246) "Automatic Hypermedia Link Generation" pp. 447–448.

ARCHIVING AND RETRIEVING MULTIMEDIA OBJECTS USING STRUCTURED INDEXES

FIELD OF THE INVENTION

This invention relates to the field of using an index to archive and retrieve information on a computer. The information includes multimedia objects, such as video clips and audio segments.

BACKGROUND OF THE INVENTION

There are many methods known in the computer art which can archive and retrieve textual expressions (words and phrases) in natural language. Primarily, these methods use key words as indexes to archive and retrieve these textual expressions. However, many things, particularly things in the area of multimedia (images and sounds), are not easily described using key words indexes. Often multimedia information like the sound of a dog barking, images shown in certain pictures, or the steps performed in a dance require more descriptive indexes than the prior art key words can provide. Key word indexes have failed to be descriptive enough because they can not easily identify the difference between a thing and an action, describe what agent performs a given action, or describe what object is acted upon. These key word failures, and others, create ambiguities when key words are used to identify and catalog information.

The key word indexes of the prior art lack the grammatical structure needed to make them more descriptive. Key word phrases have no structure because the words in the phrases lack two things: 1. a function and 2. a relationship. In a natural language, (i.e., languages spoken by humans) function and relationships of the words are provided by the language grammar (grammar rules). For example, in the English natural language phrase "a man will fall into the pool", each word has a function and a relationship to the other words in the phrase dictated by English grammar. Functionally, "man" and "pool" are nouns and "fall" is a verb. Relationships exist because, syntactically, "man" is the subject of the sentence, and, semantically, it is the theme of an action; "fall" is the predicate which describes the action; and "pool", according to the English syntax, the locational object of the sentence, describes the location of the action. Often, the object of a sentence is the recipient of the action of an agent; and the subject of the sentence is the agent of an action; for instance, "the woman pushed the ball". The word "agent" is used to describe the typical subject; that is, by default subjects are assumed to be agents. The explicit distinction between agent-subject and theme-subject is not made, since it does not affect the logic of the proposal. Similarly, we will use the word "object" to cover several syntactic functions, such as direct object, object of a preposition, and indirect object. Notice that this slot can have multiple fillers when there is more than one object as in "The child dropped the ball into the pool", where "the ball" is the direct object and "into the pool" the locational object of the action. (In all our examples we will use only single fillers). Natural languages use different kinds of grammatical rules to affect the meaning of the words. These include: defining parts of speech, ordering words in the phrase, and using word prefixes or endings, etc. Since key words, even in phrases, lack these grammatical rules, they can be less descriptive and ambiguous. For example, when the phrase "man will fall into the pool" is parsed into words, the key word "fall" has no function (it could be a verb or a noun) and could be ambiguously interpreted as "drop" or a "season of the year". Furthermore, splitting the key word phrase "cat eats mouse" into "cat", "eats", and "mouse", yields a sequence of key words with no relationship. Because there is no way to tell which word is the subject and which is the object, the interpretation becomes ambiguous. The phrase could mean: "cat eats mouse", "mouse eats cat", or "cat and mouse eats".

The problem is compounded when synonyms, hypernyms (words of a broader genus which include the key word) or hyponyms (words within the key word genus) of key words are used to expand a key word search to retrieve data. This is frequently required in Information Retrieval systems because often users use slightly different words that are not found via a direct match. For example, a synonym (hypernym) of "fall" like autumn (season) would give erroneous results when searching a database for a match to the key word "fall" which really meant "drop".

OBJECTS OF THE INVENTION

An object of this invention is an improved method of archiving and retrieving data on a multipurpose computer by using structured indexes.

Another object of this invention is an improved method of archiving and retrieving multimedia information on a multipurpose computer by using structured indexes.

Also an object of this invention is an improved method of archiving and retrieving multimedia objects on a multipurpose computer by using structured indexes related to a lexical database.

An additional object of this invention is an improved method of archiving and retrieving multimedia objects on a multipurpose computer by using structured indexes and natural language queries.

SUMMARY OF THE INVENTION

This invention is an efficient method for assisting computer users in the creation and use of structured indexes for archiving and retrieving information using a general purpose computer. The index structure is based on a grammar (grammatical rules) and is particularly descriptive for the archiving and retrieving of multimedia objects.

In a preferred embodiment, a heuristic interface is presented to the user. The heuristic interface presents information, like a film clip, to the user and receives strings of input, like a word phrase, from the user. The heuristic interface helps the user organize the input string into components having a structure according to a set of grammatical rules. Alternatively, a parser can parse natural language descriptions to identify components and their structures based on rules.

To archive information, a matched pair is created using a structured index. Using a mapping algorithm, the structured index is made of input string components (e.g. words) which now have a function and a relationship with one another. This structured index is then combined with a pointer to the information to be archived to create the matched pair. Therefore, the matched pair has two parts: 1. the pointer, called a segment number or segment, correlated to the storage location of the (multimedia) information to be archived and 2. the structured index describing the information. The matched paired is then archived or stored in the computer memory.

To retrieve the archived information, the system is queried using an input string, such as natural language string query.

In a preferred embodiment, a heuristic interface assists the user in providing an input string query that conforms to a grammar. Alternatively, a parser can parse the query string into a structured query which has a structure that is identical to or related to that of the structured index in the archived matched pairs. A search algorithm is selected and used to make a key. The key is compared to the index part (or a component(s) of the index part) of the matched pairs in the database. This comparison generates a list of the matching pairs that match the key. Therefore, this matching pair list contains the matched pairs corresponding to archived information that matches the query within the parameters defined by the search algorithm. Finally, the (multimedia) information segment number, part of each matched pair on the matching pair list, is used to retrieve the archived (multimedia) information associated with the segment number from the storage location pointed to by the segment number.

The retrieval search can be expanded by changing the search algorithm. Parts of the key can point to classes of words that are stored in a lexical database. These lexical database words are somehow related (synonym, etc.) to the word(s) in the key. Words can be chosen from the lexical database using criteria defined by the search algorithm. These words, chosen from the lexical database, are also used to search the matched pair database for a match. Any matched pair that matches one of the chosen lexical database words is returned on the matching list as well.

DETAILED DESCRIPTION OF THE INVENTION

Figure 5:
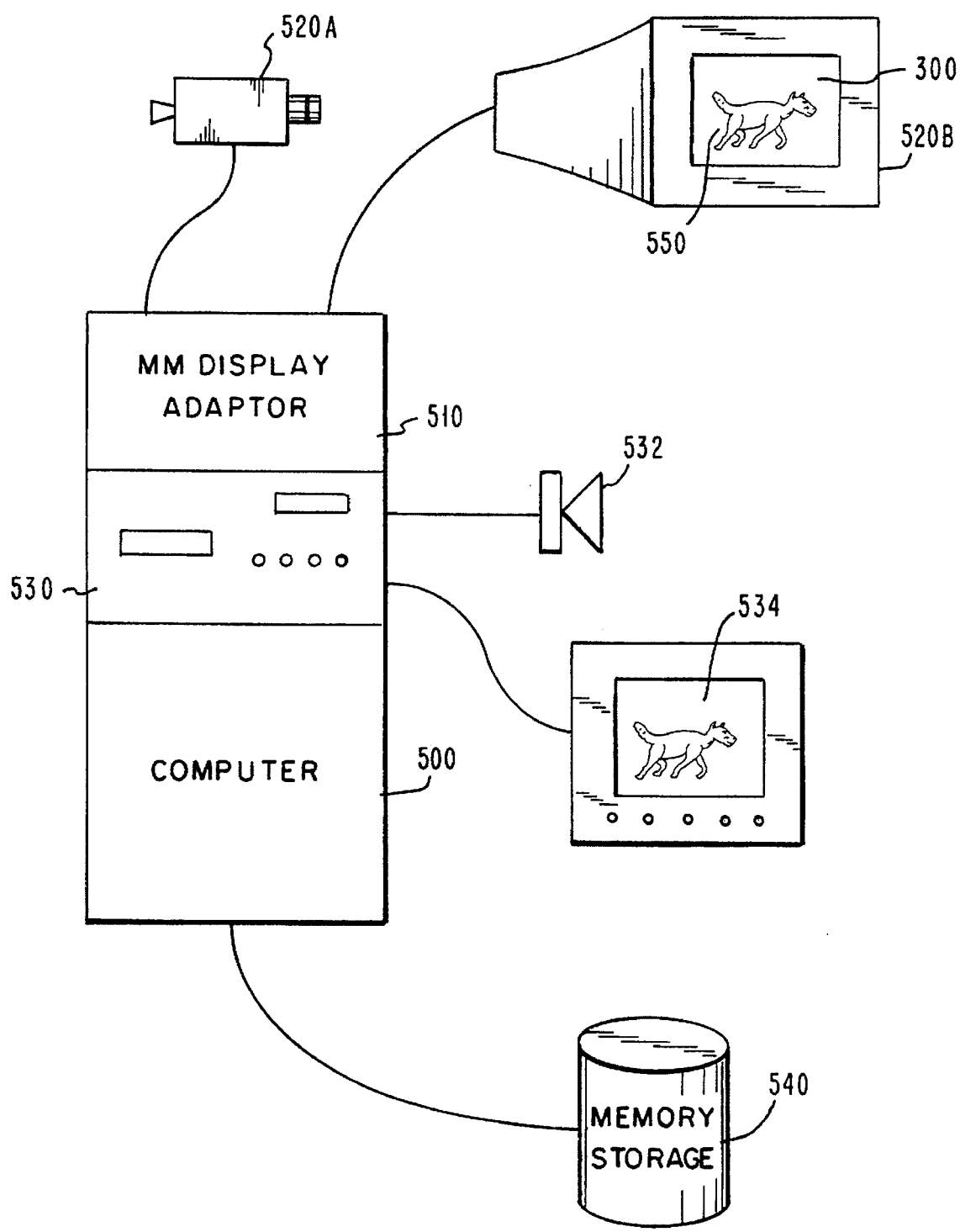
FIG. 5 shows a computer system using structured indexes to archive and retrieve information, particularly multimedia information.

The present invention is capable of running on any general purpose computer which has the ability to present multimedia information to a user. One preferred embodiment, shown in FIG. 5, uses an IBM Personal System/2 (PS/2) Model 8595 Microchannel Floor Standing 486 System 500 (described in the Quick Reference supplied with the system unit). An IBM Personal System/2 (PS/2) ActionMedia II Display Adapter 510 (described in the ActionMedia II Technical Reference) is used for audio/video capture 520A and playback 520B. This preferred embodiment also uses an IBM Operating System/2 (OS/2) 2.0 (described in the OS/2 2.0 Quick Reference), an IBM Multimedia Presentation Manager/2 (described in the IBM Multimedia Presentation Manager/2 ActionMedia(R) II Media Control Interface Programming Guide and Reference), and a Smalltalk/VPM (described in the Smalltalk/VPM Tutorial and Programming Handbook). Other multimedia hardware 530 known in the art that can be connected to a general purpose computer can also be used. This hardware 530 may include video cassette recording devices, laser disc player adapter, audio capture playback adapter, etc. The marks OS/2 and PS/2 are trademarks of the IBM Corporation, the mark ActionMedia II is a trademark of the Intel Corporation, and the mark Smalltalk/VPM is a trademark of Digitalk Inc.

The present invention uses structured indexes to archive and retrieve information in a computer database. Because structured indexes are much more descriptive than prior art key word indexes, structured indexes are particularly useful in archiving and retrieving information about multimedia objects. Generally, multimedia includes information having a sensory quality that is presented as an input or output of a computer. Multimedia information (objects) 550 includes audio 532 and visual 534 information like audio and video clips, musical recordings, speech, typed text, still pictures, drawings, animation, choreographed dance steps, etc. One reason that a structured index is useful in describing multimedia objects is that actions, agents performing actions, and recipients of actions can be included in the index.

The structured index has a structure because it carries information about 1. the function of components of the index and 2. the relationship among the index components. The function and relationship are defined by rules of a grammar. In the preferred embodiment, the components of the index are words which describe a multimedia object. The rules of grammar used to give function and relationship to the words in the index are given in a natural language grammar that uses the words. However, the invention is not limited to words as index components nor to a natural language grammar. The index can be made of any type of component which might be descriptive of the information to be archived or retrieved and any rules that define component functions and relationships can be a grammar. For instance, an index could be created for a musical clip using a series of tones given structure by rules concerning rhythm and frequency. An index into textual information like a telephone directory could be made from a series of tones, representing a phone number, which are given structure by rules concerning the frequency of the tones (the numeric value of the digits), number of tones (digits in the phone number), and the order of a tone sequence.

A structured index of one preferred embodiment takes the form:

[relation: component (function or attributes)]

As an example, this form as applied to a word index, for a single word component, becomes:

[action: word (verb, third person, future tense)]

The relation (action) and function (verb) of this index are defined by the rules of the applicable grammar, i.e. English grammar. Attributes of the word (component) are represented as the information within the parenthesis of the index. These attributes include the function of the word but may include additional information. In this example, the attributes include the word function (verb) and additional information about the verb, person and tense. Attribute information can include grammatical descriptions about a word (like person, number, tense, gender) or other descriptive information (like color, size, weight). An index like this, that is descriptive of just one word (component), is called a simple index.

To create an index that is more descriptive of a word (component) phrase than a one word simple index, a compound index is used. A compound index contains simple indexes for more than one word (component) in the phrase.

For example, in the English language phrase "Dad will fall into a pool", a compound structured index could take the form:

[[agent: Dad (noun, human)], [action: fall (verb, third person, future tense, drop)], [object: into the pool (prepositional phrase, object, swimming pool)]]

In this example, the compound structured index generated from the natural language word phrase, based on English grammar, defines the relationship (agent, action, and object or location) of the structured index word components "Dad", "fall", and "into the pool" respectively. The function of each component is given by the grammar (noun, verb, prepositional phrase). In addition, along with the function, other attribute information is included. Here the attributes give information about the component/word useful in associating it with other components/words. Attributes include synonyms ("drop"), and hyponyms ("swimming pool").

Grammar is the set of rules which gives components in a sequence a function and relationship, i.e. a structure. The rules of grammar organize and/or identify the components in a sequence in such a way to give them specific functions. For example, the grammar used in the preferred embodiment is a natural language grammar of English, which has subjects (nouns and noun phrases), predicates (verbs), and objects (nouns, noun phrases, prepositional phrases, etc.) arranged in a sequence determined by grammatical rules to create a phrase or sentence. Altering the function and relationship of the words according to the grammatical rules can change the meaning of the word phrase or sentence. Although a natural language grammar and a word sequence (phrase or sentence) are used in the preferred embodiment, practice of the invention is not limited to natural language grammar. The invention can use as a grammar any set of rules used to give structure to a sequence of components in order to create a sensory meaning (auditory or visual). This might include the rules of music applied to a sequence of frequency tones to create a melody, rules of geometry applied to a sequence of patterns to create a shape, or the rules of speech applied to a sequence of phonemes to create a recognizable word. The applied rules of grammar are used to create the structured index. The rules can also be used in designing a heuristic interface for archiving and retrieving information.

Figure 1:
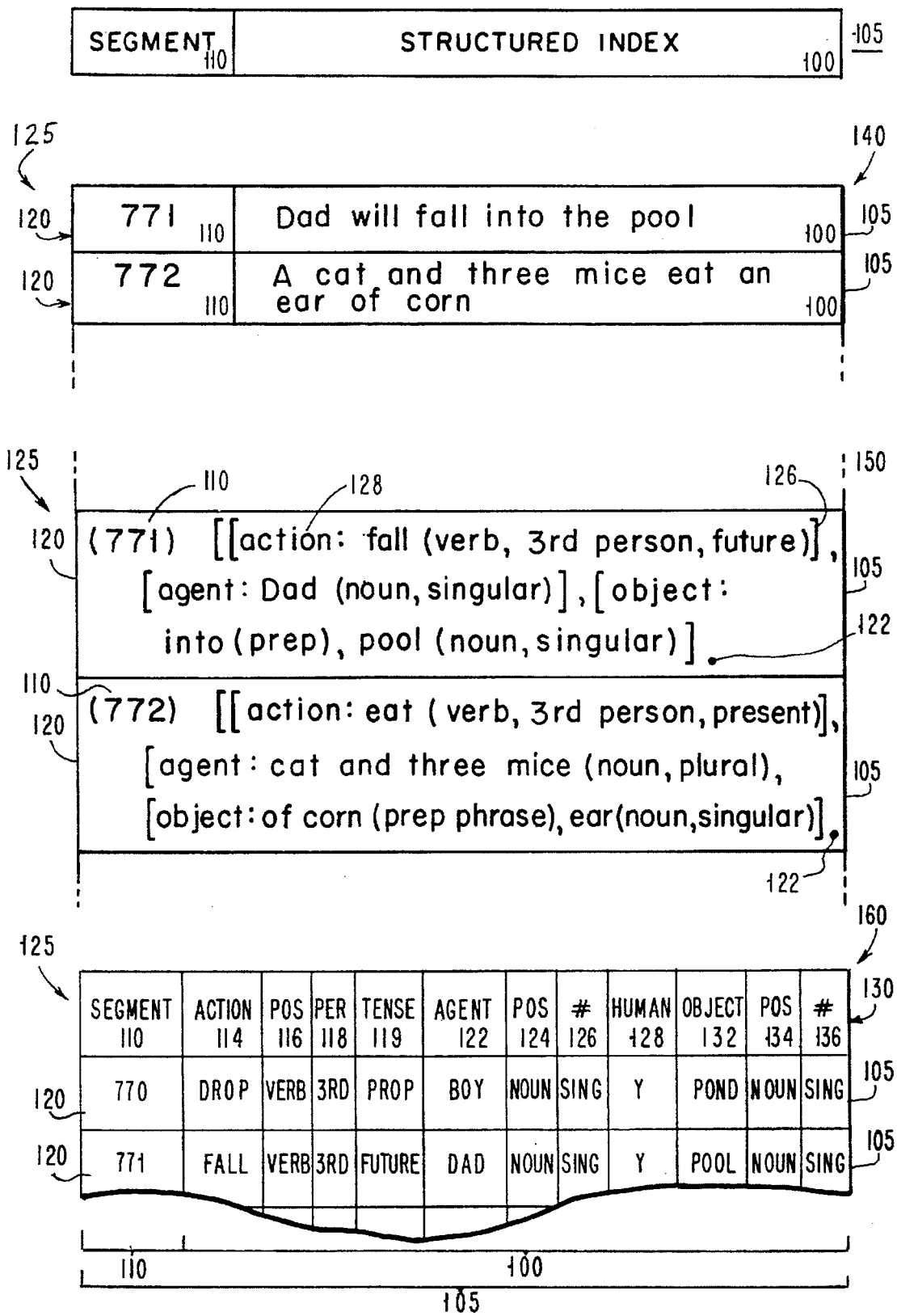
FIG. 1 shows preferred structured indexes, of the present invention, as part of a matched pair record.

Refer to FIG. 1. The present invention archives and retrieves information by using a structured index database 125 that stores matched pairs 105. A matched pair 105 includes two parts: 1) a segment 110 that identifies the location of the information to be archived or retrieved and 2) an associated structured index 100.

The segment 110 can be the starting location in computer memory (540 in FIG. 5) which contains the information, a pointer to some storage media location which contains the information, or other data commonly used to access information. Three preferred matched pair memory structures are now described.

One matched pair embodiment stores matched pairs 105 as a "flat" data file 140 where the segment number 110 and associated index 100 are stored as sequential records 120 in a structured index database 125. For example:

(segment(771), "Dad will fall into the pool") (segment (772), "a cat and three mice eat an ear of corn")

are two consecutive records 120 of matched pairs 105. The multimedia information associated with "Dad will fall into the pool" is located at the multimedia storage location 771 just as the information associated with "a cat and three mice eat an ear of corn" is located at multimedia storage location 772. For example, the multimedia information in these cases could be a digitized photograph stored in the memory location. The "index" stored (here a word phrase) is not "structured" per se because the function and relationships of the words are not identified. In this embodiment, the word phrase "index" will be structured during the retrieval process. See below.

A more preferred embodiment 150 also stores the segment 110 and structured index 100 match pairs 105 as records 120 in the structured index database 125. Here the records each have fields and the records are delineated from one another by delimiters like periods 122. Fields within each record can be identified by their position in the record, delimiters like parenthesis 126, or by field identifiers like names 128 (e.g. action:). Storing records in this manner is well known.

A most preferred embodiment stores the segment 110 and structured index 100 match pairs 105 as sequential records 120 in the structured index database 125 where each record has a number of predefined fields 130. For example,

---

{(segment(770), [[action: drop (pos = verb, person = 3rd, tense = present)],
[agent: boy (pos = noun, number = sing, human = yes) ], [object: pond
(pos = noun, number = sing, prep = into)]]}
{segment(771), [[ action: fall (pos = verb, person = 3rd, tense = future) ], [ agent:
dad (pos = noun, number = sing, human = yes) ], [ object: pool (pos = noun,
number = sing) ]])},

--- shows two stored matched pairs 105 using compound structured indexes 100 as records 120 in the structured index database 125. (Note also, that here the attributes have the form "attribute=value", e.g., "tense=future"). The records are stored in a table like structure 160. One preferred embodiments is a relational database. Each record 120 in the table 160 has a field for the: segment 110 number (770,771); the action 114 (drop, fall), three attributes of the action (part of speech (pos) 116, person 118, and tense 119); the agent 122 (boy, dad); three attributes of the agent (part of speech 124, number 126, and whether or not the agent is human 128); the object 132 (pond, pool); and two attributes of the object (part of speech 134 and number 136). One or more of these record fields can be searched during the retrieval process to find a matched pair 105 record 120 which matches a retrieval query. Note that for technical purposes, the function of a word could be identified with its part of speech (pos) as specified by the grammar. Some of the data might be ignored. For instance, the fact that the preposition value is "into" (prep=into) might be irrelevant.

The preferred embodiment allows a search of the structured index database 125 to be broadened by adding another database of components (in the preferred embodiment these are words) arranged in a lexical hierarchy. This second database, called the lexical database, is constructed in any of the ways well known in the art.

The lexical database arranges words hierarchically (or other components) with a relatively narrow meaning in classes (hyponyms) under a words with a broader meaning (hypernym), for example, "beaver" and "cat" are hyponyms of "mammal", which is a hyponym of "animal." These words in turn are included in a class of words under a word with a still broader (hypernym) meaning. In this manner, the database words are related to one another in a hierarchical way.

Any lexical database known in the art can be used as the lexical database in the present invention. Lexical databases exist that include words and their synonyms, hypernyms, and hyponyms. Information in the databases of dictionary entries has been parsed to determine the structure of the entries, and the processed entries have been loaded into still other prior art lexical data bases. For example, in some lexical databases, pronunciation information, parts of speech, and definitions are stored as individual fields accessible by a word. Definition texts are used to extract implicit information about words. Synonyms, are available explicity in the entries of thesauri. Hyponyms can be inferred from the definition text (e.g. a car is defined as a "vehicle" moving on wheels in Webster's 7th—Merriam 1963). Once extracted from a variety of sources, this information can be loaded into a lexical data based for subsequent processing. For example, in a lexical database, an entry for the word "car" may look like this:

car-
  synonyms
    auto, automobile, jalopy, machine, motor, motorcar, vehicle, buffet car, cable car, coach, dining car, (railway), sleeping car, van
  hypernyms
    vehicle, chariot, cage, portion
  hyponyms
    boxcar, cable car, caboose, chair car, chariot, coach, dining car, flatcar, go-devil, gondola, gondola, hand car, lounge car, mini cab, motorcar, parlor car, rattletrap, reefer, stock car, sidecar, sleeping car, smoker, telpher, trolley, truck, wagon, way car where the synonym, hypernym and hyponyms are fields in a record of the lexical database that contain lists of words extracted from previous processing.

Figure 2:
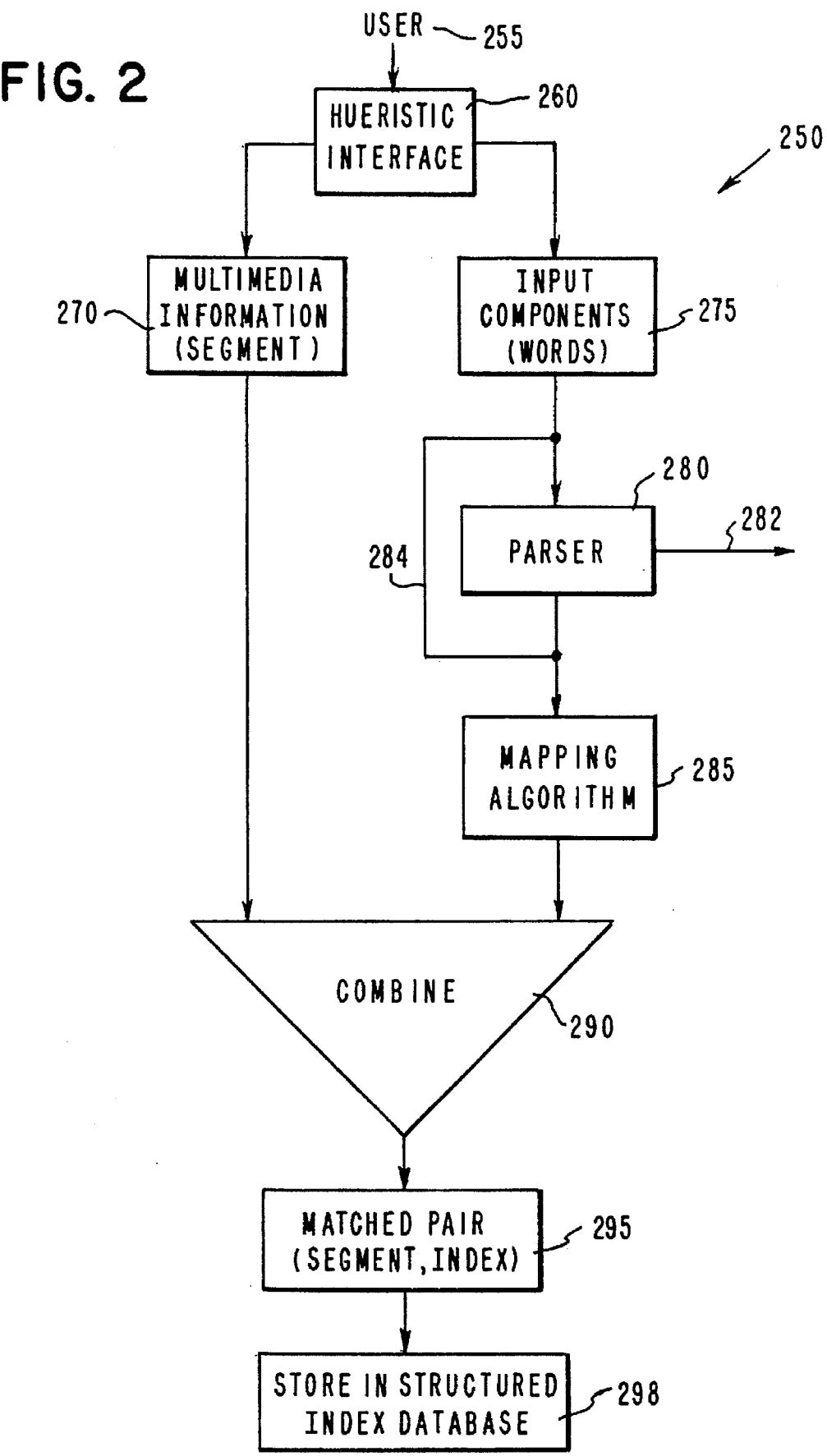
FIG. 2 is a flow chart of the method of archiving information, like multimedia information, by using a structured index.

Refer to FIG. 2 which shows the process of archiving information 250 using the preferred embodiment. A user 255 interacts with a heuristic interface 260 that presents the user with multimedia information 270 and prompts the user to enter a string of components (words) according to a given grammar 275. Typically, a parser 280 may operate on the entered string to parse it into components. Alternatively, the parser 280 may be omitted 284.

A mapping algorithm uses these components to produce a structured index 285 of a form similar to that described above. The structured index is combined 290 with the segment number of the information to be cataloged 270 to produce a matched pair 295 which is stored in the structured index database 125 as shown in box 298.

Figure 3:
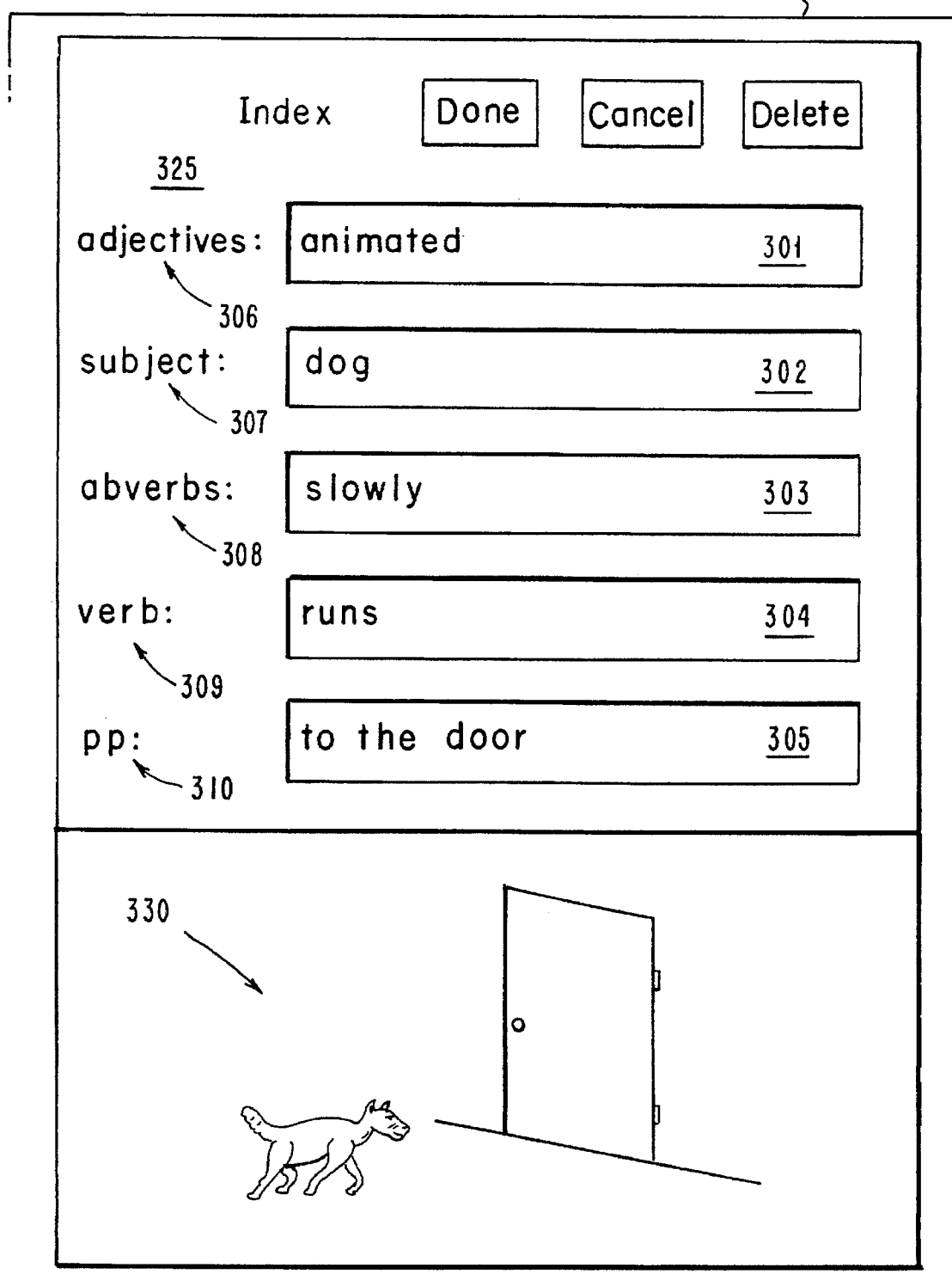
FIG. 3 shows a computer screen display which uses a template and a multimedia display as a heuristic interface with a user.

FIG. 3 shows a preferred embodiment of a video heuristic interface 300. The heuristic interface in the preferred embodiment is a video display 300 that can present multimedia information. The multimedia information is stored in a multimedia storage device or is digitized and stored in computer memory. The display includes a template 325 which prompts the user to enter an English natural language description of the multimedia information 330, an animated picture 330 of a dog running slowly to a door. The template 325 is formatted to encourage the user to describe the picture with a phrase or sentence structured using standard English grammar. The input sections of the template, 301 through 305 are designed so that the user enters textual information that describes the multimedia information 330 in terms of English grammar parts of speech (functions and/or relationships, 306 through 310). In this example, the user fills the input section 301 with an adjective 306 (animated) describing the clip or the subject 307 (dog) in input section 302. The action relationship is describe by the verb 309 (runs) which the user puts in input section 304. An adverb 308 relationship (slowly), describing the verb 309, is placed in the input section 303. An object of the action relationship is described by the prepositional phrase 310 placed in input section 305. Therefore, by using a heuristic inteface 300, a user parses a natural language description of the multimedia information 330 into components which have a function and a relationship among one another according to a natural language grammar. In this preferred embodiment, box 280 of FIG. 2 can be by-passed 284 because the date (301 through 305) placed in the template (box 275 of FIG. 2) can be directly used to create a structured index (box 285). Any software environment, well known in the art, that is capable of creating an input template can be used as this heuristic interface 300.

In an alternative preferred embodiment, the heuristic interface can be any natural language interface known in the art. For example, the multimedia information 330 to be archived is presented on the screen 300 along with a natural language query or a prompt. Then the user responds by inputting descriptive information, typically natural language text, about the multimedia clip. Inputting the text is shown in box 275 of FIG. 2.

The parser analyzes the natural language description 275 according to the rules of some grammar, typically a natural language grammar like English, and returns the sentence or phrase parsed into words identified as parts of speech, constituents and functions. The parser 280 can be any one of a number of embodiments known in the art. Parsers are also available to provide additional information about the words like tense, number, and other attributes. If the parser is unable to parse the natural language description 275 because the description does not conform to the rules of English grammar or for any other reason, the natural language description is dicarded 282. An indication that the description has been discarded can be given to the user (so that he can reformulate it).

The output of the parser 280 takes the form of components of a structured index, preferably components of a compound structured index (see above). At this point (box 285), a mapping algorithm analyzes the output of the parser and creates a structured index by transferring the appropriate parts of the parser output to the correct locations in the structured index database 125 that is described above. The mapping algorithm function, box 285, can be a part of the parser or a separate algorithm for mapping the parser output into the structured index database 125. The mapping algorithm also can be designed to add information to the parser output or alternatively can discard certain information that comes from the parser. (Note that in one preferred embodiment, the output comes directly 284 from box 275). For example, given the prior assumption that most subjects are agents, the phrase "the window breaks" would be parsed as:

[[agent: window (noun)], [action: breaks (verb)]]

In this embodiment, the phrase was parsed incorrectly because the word "window" is in fact the theme of the sentence. Since most agents are animate nouns, the mapping algorithm 285, by checking agent fields against a list of animate nouns could recognize the error and redefine the structured index as:

[[object: window (noun)], [action: breaks (verb)]]

There are known methods, which can be used in the mapping algorithm that can redesignate the word "window"

as an object and store it in the structured index database 125 correctly. The mapping algorithm 285 can also add additional information, such as additional attributes to the parser output. By comparing the words to databases and/or using grammatical rules, the mapping algorithm can add information about a word's person, tense, number, or other attributes. For instance, a proper name of a person can be compared to a list of celebrities and can have an attribute designating the name as a celebrity if the name is on the list. Hyponyms, hypernyms, and synonyms can be added as attributes in a similar way by using other databases, like the lexical database already described. Alternatively, the mapping algorithm 285 can place only selected information from the parser (or box 275) output to store in the structured index database. For example, the mapping algorithm 285 might only store action and object type words along with their attributes in the structured index database while discarding all subject type words with their attributes.

The segment number 110 or segment 110 describing the storage location of the information to be archived by the index 100 is also placed in the memory record 120 along with the structured index information 100 stored by the mapping algorithm 285. Therefore, the index 100 and segment 110 combine 290 in one record 120 to form a matched pair 105 (box 295) associated with the information to be archived. Preferred embodiments of the matched pair 105 in the structured index database 125 are described above. The structured index database 125 comprises a plurality of these matched pair 105 records 120 (box 298) archived by this method.

Figure 4:
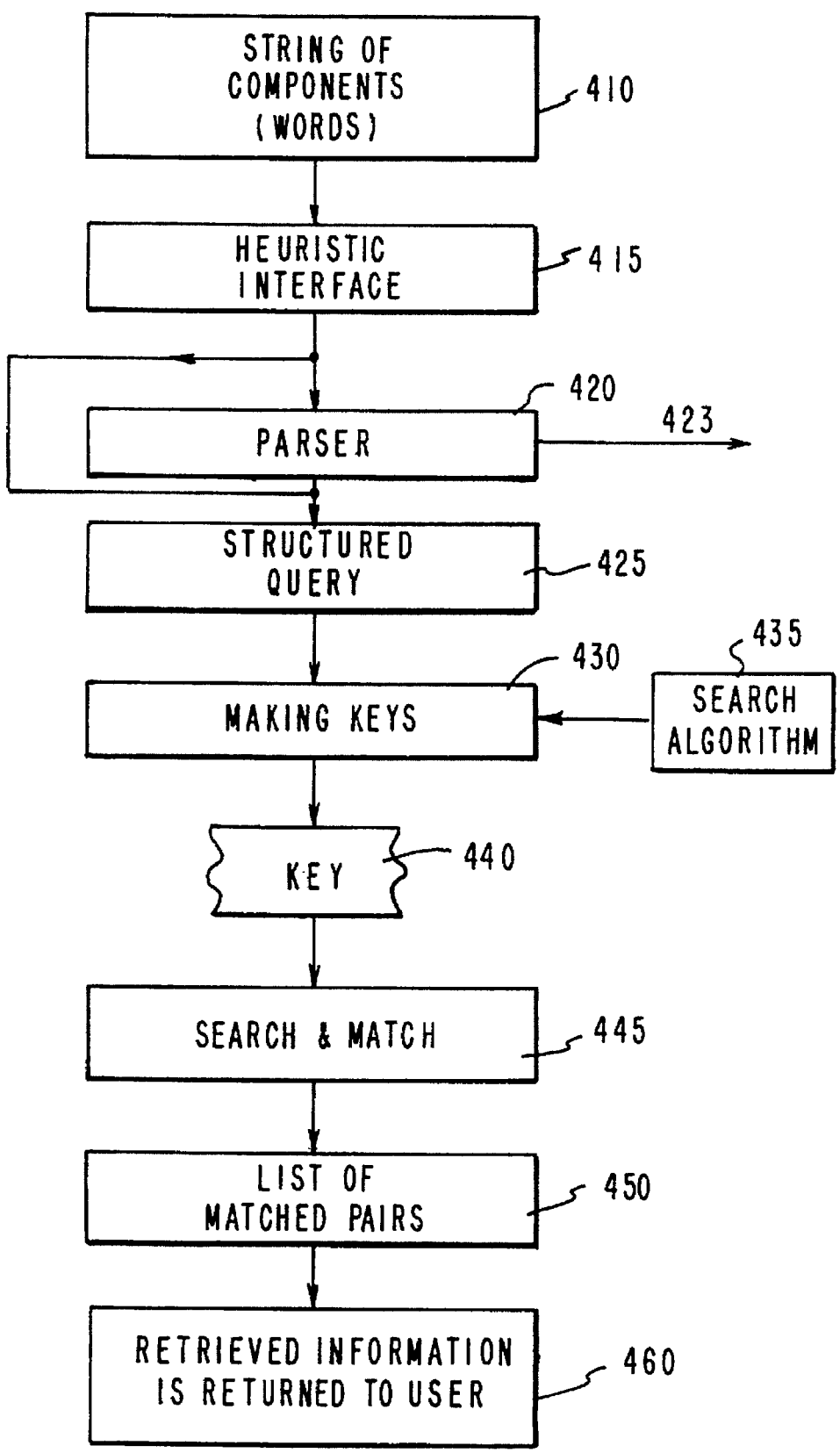
FIG. 4 is a flow chart of the method of retrieving information, like multimedia information, by using structured indexes.

FIG. 4 is a flow chart of the present process that is used in retrieving information. A string of components, typically words 410, are entered into the computer by a user through a heuristic interface 415. The heuristic interface 415 prompts the user to pose the query with a structure as determined by the grammar similar to that used in archiving the information. This embodiment can use an input template 325 as shown in FIG. 3. Alternatively, a known natural language interface could be used as the heuristic interface 415 prompting the user to enter a natural language query. In another alternative, the user could be another computer or input device which is able to structure a plurality of queries according to the rules of the grammar used.

If the heuristic interface 415 is designed to receive a natural language query, a parser 420 is used. However, if the heuristic interface 415 grammatically organizes the query, e.g., by using a template 325 like that shown in FIG. 3, the parser 420 is bypassed 418. A parser parses the query and returns the query parsed into a structured query. If the parser can not parse the query because it does not conform to the grammar used, the query is discarded 423. The parser 420 can indicate this failure to the user (so that he can reformulate the query or decide to use a key-word based search.)

The structured query 425 has the components, e.g. words, of the query identified as to their function and relationship in the query according to the rules of grammar. For example, the query, "Dad will fall into the pool" is parsed (or organized by the heuristic interface 415) into the following:

[[action: fall (verb, 3rd person, future)], [agent: Dad (noun, singular)], [object: into (prep), pool (noun, singular)].

In the preferred embodiment, one or more of the components and/or its attributes in the structured query must be a field which matches a field in the structured index database 125 so that a search and match 445 can later be performed. It is also possible to restructure a query so that these fields match.

A search algorithm 435 operates on the components of the structured query 425 to make 430 a key. The key 440 is then used to search 445 the structured index database and return 450 a list of matched pairs which satisfy the query given the criteria of the search algorithm 435. The search algorithm 435 broadens or narrows the criteria of the structured index database search 445 by altering the key 440. Specifically, the key 440 is made 430 from components of the structured query modified by criteria for the search. For example, if the search criteria requires only that an action and an object match, the key could be created without a agent field. Alternatively, there could be an agent field in the key with a "don't care" (wild card) symbol like "*" entered.

Another search algorithm 435 might broaden the search by designating certain attributes of the components making up the key as "don't care". For example, the key may be designed to match entries with any verb tense or number. Another search algorithm 435 might broaden the search by expanding one or more key components to related words like synonym, hypernyms, and/or hyponyms. The algorithm 435, by using the lexical database, could substitute or add to the component(s) or attributes of the components of the key to alter the search criteria.

Several examples of keys 440 made 430 from different search algorithms 435 are now presented using the following structured query 425.

[[action: fall (verb, 3rd person, future)], [agent: Dad (noun, singular)], [object: into (prep), pool (noun, singular)].

A search algorithm 435 can make a key 440 that would match a structured index database 125 record 120 if only the action and object fields and their attributes match, as follows:

[[action: fall (verb, 3rd person, future)], [object: into (prep), pool (noun, singular)].

or alternatively as follows:

[[action: fall (verb, 3rd person, future)], [agent: *], [object: into (prep), pool (noun, singular)].

Here the agent component of the key has been removed or designated "don't care." An record 120 like "a dog will fall into the pool" will match 445 the key 440.

A search algorithm 435 can make 430 a key that would match 445 a structured index database 125 record 120 regardless of verb person or tense or noun number as follows:

[[action: fall (verb, *, *)], [agent: Dad (noun, *)], [object: into (prep), pool (noun, *)].

Here the algorithm 435 has put a "don't care" designation in the verb person and tense and the noun number fields. An entry like "three dads fell into the pools" would match 445 this key 440. Likewise, anyone or anything falling into a pools (s) would match the key.

A search algorithm 435 can make 430 a key that would match a structured index database entry with a word similar to a component as follows:

[[action: fall (verb, 3rd person, future)], [agent: Dad (noun, singular)], [object: into (prep), synonym=pool (noun, singular)].

An entry like "Dad will fall into the pond" will match this key because synonyms for "pool", typically founded in the lexical database, are used to match components in the object field.

A search algorithm 435 can make 430 a key 440 using synonyms (and/or hyponyms and/or hypernyms) with every component of the key as follows:

[[action: synonym=fall (verb, 3rd person future)], [agent: hyponym=Dad (noun, singular)], [object: into (prep), synonym=pool (noun, singular)]].

An entry like "Daddy drops into the pond" will match this key because the "synonym "will drop" matches "will fall", the synonym "pond" matches "pool", and "Daddy" is a hyponym that matches "Dad".

Once the key 440 has been created, it can be matched to the entries in the structured index database 125 by using any of the known searching and matching algorithms in the art. Many variations are possible. For example, the search algorithm 435 may permit a match if the spellings of a key component and a field in the database are similar but do not match identically. The search may use logical operations with the components of the key, i.e., identifying a match if an entry matches one component of the key ORed with another.

The search and match 445 step returns a list (if any) called a record match list 450 of records (if any) in the structured index database 125 that match the key 440. The segment number 110 of each matched pair 105 record 120 on the list 450 is then used to locate 460 the information associated with the matched pair 105. This information is returned 460 to the user as the information corresponding to the query.

There are many embodiments that one skilled in the art could develop given this disclosure which are contemplated by this invention. For example, in one alternative embodiment of the structured index database 125 discussed above, the matched pairs are stored as a "flat" data file where the part of the matched pair is not a structured index but only a field of text data. In this embodiment, a preliminary search and match is performed to select which entries could possibly match a key 440. This might be done using standard key word searching. The records 120 selected by doing this search are then put though a parser that parses the text data of the matched pair into components that are in turn made into structured indexes in the matched pair as described above. The selected entries, now having a structured index in their match pair, are searched and matched a second time as described above.

We claim:

1. A method for identifying a location of multimedia information in a computer database comprising the steps of:

using a heuristic interface to assist a user in creating a structured index conforming to a set of rules of a natural language grammar from two or more components of a description of the multimedia information, the structured index having a function field for each of one or more of the components, the function field containing one or more functions describing a component function of the component, the component function determined by the set of rules of the natural language grammar, and the structural index further having a relationship field for each of one or more of the components, the relationship field containing a relationship between the respective component and one or more of the other components, the relationships also being defined by the natural language grammar, the grammar also defining a structure of the description;

creating a matched pair by associating the structured index with a storage location information pointer that points to a location containing the multimedia information; and storing the matched pair in a computer memory to archive the multimedia information as being in the location identified by the storage location information pointer.

2. A method for identifying a location of multimedia information in a computer database, as in claim 1, where the multimedia information includes a video clip.

3. A method for identifying a location of multimedia information in a computer database, as in claim 1, where the multimedia information includes a still picture.

4. A method for identifying a location of multimedia information in a computer database, as in claim 1, where the multimedia information includes an audio clip.

5. A method for identifying a location of multimedia information in a computer database, as in claim 1, where the heuristic interface is a template prompting the user to describe the multimedia information by using one or more natural language words as components where the words conform to the natural language grammar.

6. A method for identifying a location of multimedia information in a computer database, as in claim 1, where the components include first data contained in a database with a lexical hierarchy, the database having other data that is related to the first data as defined by the lexical hierarchy.

7. A computer apparatus for retrieving data comprising:

a memory storage means for storing a structured index database, the database having a plurality of matched pair records, each matched pair record having a segment and a structured index having a function field for each of one or more components of description of stored information, the function field containing one or more functions describing a component function of the component, the component function determined by a set of rules of a natural language grammar, and the structured index further having a relationship field for each of one or more of the components, the relationship field containing a relationship between the respective component and one or more of the other components, the relationships also being defined by the grammar, the grammar also defining a structure of the description;

a display means for displaying information to be archived and a heuristic interface with the user;

a storage algorithm for creating a matched pair associated with information to be archived and storing a plurality of matched pairs as records, a segment number of the matched pair pointing to a storage location of the information associated with the matched pair; and a retrieval algorithm for creating a key from one or more components taken from a user query in the natural language grammar, the key having fields one or more of the key fields being a function key field being one of the functions defining a selected component in the structured query and one or more of the key fields being a relationship key field being one of the relationships defining the selected component of the structured query, the key being used to search the structured index database to select matched pairs that match the key, the segment of the selected matched pair records being used to retrieve information associated with the matched pair.

8. A computer apparatus, as in claim 7, where the heuristic interface is a graphical display that prompts a user to input descriptive information about a multimedia object according to the grammar.

9. A computer apparatus, as in claim 7, where the heuristic interface is a graphical display that prompts a user to input a natural language description about a multimedia object which is converted into structured index fields by a parser.

* * * * *